(12) United States Patent
Mizuno

(10) Patent No.: US 11,438,475 B2
(45) Date of Patent: *Sep. 6, 2022

(54) IMAGE READING APPARATUS

(71) Applicant: Brother Kogyo Kabushiki Kaisha, Nagoya (JP)

(72) Inventor: Tomoyuki Mizuno, Gifu (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/160,522

(22) Filed: Jan. 28, 2021

(65) Prior Publication Data

US 2021/0152703 A1 May 20, 2021

Related U.S. Application Data

(63) Continuation of application No. 16/797,080, filed on Feb. 21, 2020, now Pat. No. 10,911,625.

(30) Foreign Application Priority Data

Mar. 27, 2019 (JP) .............................. JP2019-060889

(51) Int. Cl.
*H04N 1/04* (2006.01)
*H04N 1/00* (2006.01)

(52) U.S. Cl.
CPC ..... *H04N 1/00557* (2013.01); *H04N 1/00588* (2013.01); *H04N 1/00604* (2013.01); *H04N 1/00615* (2013.01)

(58) Field of Classification Search
CPC .......... H04N 1/00557; H04N 1/00588; H04N 1/00604; H04N 1/00615
USPC ........................................ 358/498, 496, 401
See application file for complete search history.

(56) References Cited

U.S. PATENT DOCUMENTS 10,737,896 B2 * 8/2020 Ito ........................ B65H 29/14
10,911,625 B2 * 2/2021 Mizuno .............. H04N 1/00557
2019/0238700 A1 8/2019 Ito

FOREIGN PATENT DOCUMENTS

JP 2005-008283 A 1/2005

* cited by examiner

*Primary Examiner* — Cheukfan Lee
(74) *Attorney, Agent, or Firm* — Burr & Brown, PLLC

(57) ABSTRACT

An image reading apparatus, including a feed tray, a conveyance guide, a conveyer, a reading sensor, a first housing, a first driving source, a first driving train, a second driving source, and a second driving train, is provided. The first housing accommodates at least the conveyance guide and the conveyer and has a first outer face and a second outer face facing opposite to each other in a widthwise direction. The first driving source and the first driving train are accommodated in the first housing on a side toward the first outer face. The first driving train transmits a driving force from the first driving source to the conveyer. The second driving source and the second driving train are accommodated in the first housing on a side toward the second outer face. The second driving train transmits a driving force from the second driving source to the movable plate.

7 Claims, 9 Drawing Sheets

IMAGE READING APPARATUS

CROSS REFERENCE TO RELATED APPLICATION

This application is a continuation application of U.S. patent application Ser. No. 16/797,080, filed Feb. 21, 2020 and claims priority from Japanese Patent Application No. 2019-060889, filed on Mar. 27, 2019, the entireties of which are incorporated herein by reference.

BACKGROUND

Technical Field

An aspect of the present disclosure is related to an image reading apparatus.

Related Art

An image reading apparatus including a document feeder is known. The document feeder may include a feed tray, a conveyance guide, and a conveyer.

The feed tray may support an original document being fed and may move upward or downward in a vertical direction according to an amount of sheets in the original document supported by the feed tray. The conveyance guide may guide the original document to be conveyed from the feed tray.

The conveyer may include a document pickup device, a conveyer roller, and a registration roller. The conveyer may convey the original document supported on the feed tray to travel along the conveyance guide. At an intermediate position along the conveyance guide, arranged may be an image reading position, at which an image of the original document being conveyed along the conveyance guide may be captured.

The document feeder may be equipped with a first driving device to drive the conveyer and a second driving device to move the feed tray in the vertical direction. The first driving device and the second driving device may be arranged on one side of the conveyance guide in a widthwise direction in the document feeding apparatus.

SUMMARY

In the above-mentioned document feeder, items that form the first driving device and the second driving device such as motors and gears may be arranged closely to one another in a limited area on the one side of the document feeder in the widthwise direction, but it may be difficult to reserve a substantial capacity for those items. In this regard, freedom of layout to arrange the first driving device and the second driving device within the document feeder may be limited.

The present disclosure is advantageous in that an image reading apparatus, in which a first driving source, a first driving train, a second driving source, and a second driving train may be arranged more freely, is provided.

According to an aspect of the present disclosure, an image reading apparatus, including a feed tray, a conveyance guide, a conveyer, a reading sensor, a first housing, a first driving source, a first driving train, a second driving source, and a second driving train, is provided. The feed tray is configured to support sheets for being fed. The feed tray includes a movable plate configured to move vertically according to an amount of the sheets supported by the feed tray. The conveyance guide is configured to guide the sheets conveyed from the feed tray. The conveyer is configured to convey the sheets supported by the feed tray along the conveyance guide. The reading sensor is configured to read images of the sheets conveyed along the conveyance guide. The first housing accommodates at least the conveyance guide and the conveyer. The first housing has a first outer face and a second outer face facing opposite to each other in a widthwise direction of the conveyance guide. The first driving source is accommodated in the first housing on a side toward the first outer face. The first driving source is configured to produce a driving force. The first driving train is accommodated in the first housing on the side toward the first outer face. The first driving train is configured to transmit the driving force from the first driving source to the conveyer. The second driving source is accommodated in the first housing on a side toward the second outer face. The second driving source is configured to produce a driving force. The second driving train is accommodated in the first housing on the side toward the second outer face. The second driving train is configured to transmit the driving force from the second driving source to the movable plate.

BRIEF DESCRIPTION OF THE ACCOMPANYING DRAWINGS

DETAILED DESCRIPTION

In the following paragraphs, described with reference to the accompanying drawings will be an embodiment of the present disclosure. It is noted that various connections may be set forth between elements in the following description. These connections in general and, unless specified otherwise, may be direct or indirect and that this specification is not intended to be limiting in this respect. It will be understood that those skilled in the art will appreciate that there are numerous variations and permutations of an image reading apparatus that fall within the spirit and scope of the invention.

[Embodiment]

Figure 1:
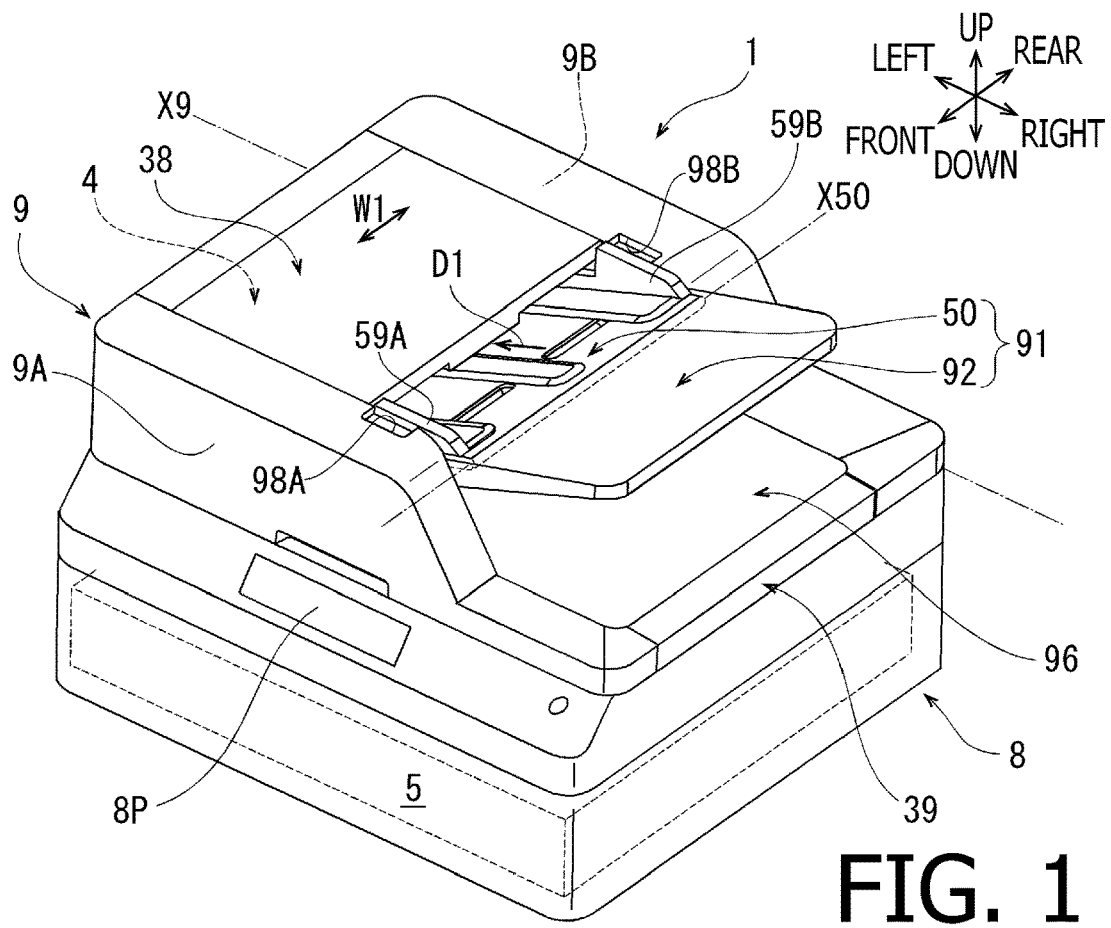
FIG. 1 is a perspective view of an image reading apparatus according to an embodiment of the present disclosure.

FIG. 1 shows an image reading apparatus 1 according to the embodiment of the present disclosure. As shown in FIG. 1, positional relation within the image reading apparatus 1 and each part or item included in the image reading apparatus 1 will be mentioned on basis of the orientation of the image reading apparatus 1 as indicated by arrows in FIG. 1. For example, a side, on which an operation panel 8P is arranged, is defined as a front side of the image reading apparatus 1, and a side opposite to the front side is defined as a rear side. A right-hand side and a left-hand side to a user who faces the front side of the image reading apparatus 1 are defined as a rightward side and a leftward side, respectively. Moreover, a right-to-left or left-to-right direction may be called as a crosswise direction, a front-to-rear or rear-to-front direction may be called as a front-rear direction, and a direction orthogonal to the crosswise direction and to the front-rear direction may be called as an up-down direction or a vertical direction. Furthermore, directions of the drawings in FIGS. 3-10 are similarly based on the orientation of the image reading apparatus 1 as defined above and correspond to those with respect to the image reading apparatus 1 shown in FIG. 1 even when the drawings are viewed from different angles.

<Overall Configuration>

As shown in FIGS. 1-4, the image reading apparatus 1 includes a first housing 9 and a second housing 8 arranged at a position lower than the first housing 9.

As shown in FIG. 1, the second housing 8 has an approximate shape of a short rectangular box. On a front side of the second housing 8, arranged is the operation panel 8P including a touch panel. In a lower position in the second housing 8, stored is an image forming unit 5, which may form an image on a sheet in one of known printing techniques such as inkjet printing and laser printing.

Figure 4:
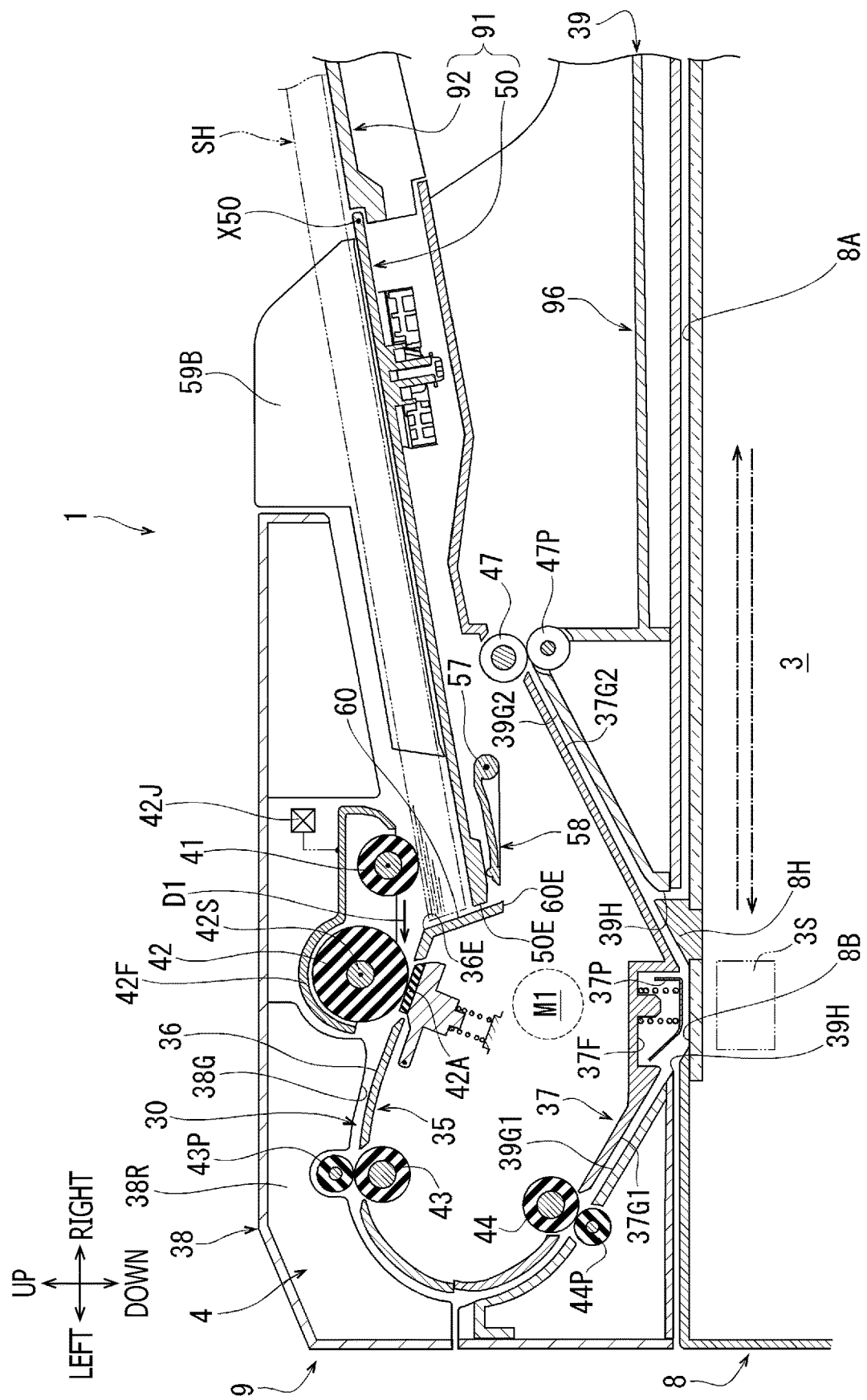
FIG. 4 is a cross-sectional partial view of the image reading apparatus according to the embodiment of the present disclosure.

As shown in FIG. 4, in an upper area in the second housing 8, arranged is a reader unit 3, which may be used when an image of an original document is read.

Figure 5:
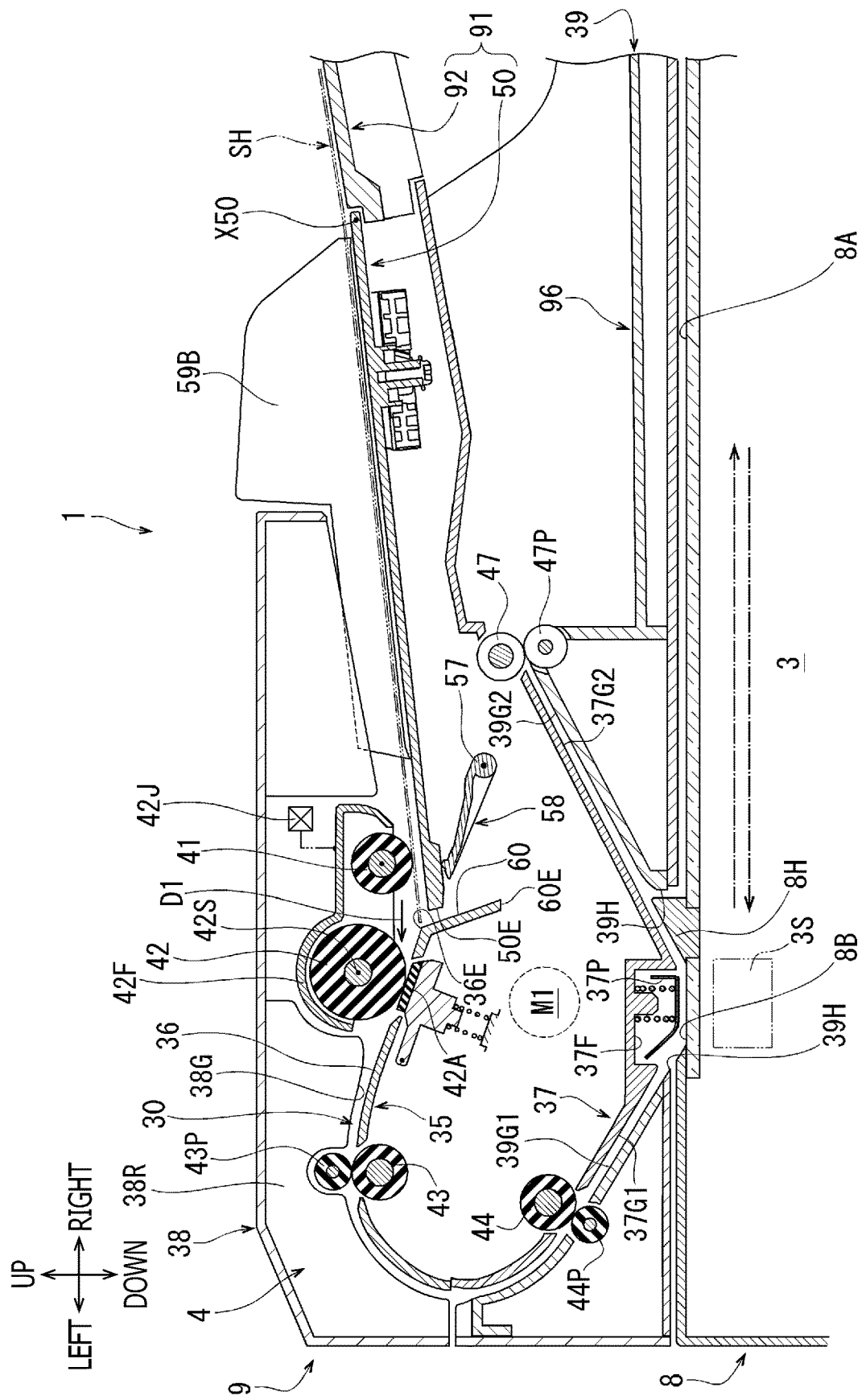
FIG. 5 is another cross-sectional partial view of the image reading apparatus according to the embodiment of the present disclosure.

In the first housing 9, arranged are a feed tray 91, an ejection tray 96, and an automatic conveyer 4. The feed tray 91 and the ejection tray 91 are arranged in a rightward area in the first housing 9. As shown in FIGS. 4 and 5, the feed tray 91 supports one or more sheets SH to be fed. The automatic conveyer 4 includes a conveyance guide 30, which is arranged on a downstream side of the feed tray 91 in a conveying direction D1 to convey the sheets SH. The conveying direction D1 is a direction for each sheet SH to travel along the conveyance guide 30, leftward from the feed tray 91, turning downward and rightward in a shape of U at a leftward area in the openable/closable body 9, to reach the ejection tray 96.

The automatic conveyer 4 may be used when the sheets SH supported on the feed tray 91 are conveyed one by one in the conveying direction D1 along the conveyance guide 30 so that images of the sheets SH being conveyed are read by the reader unit 3 and ejected to rest on the ejection tray 96.

Figure 2:
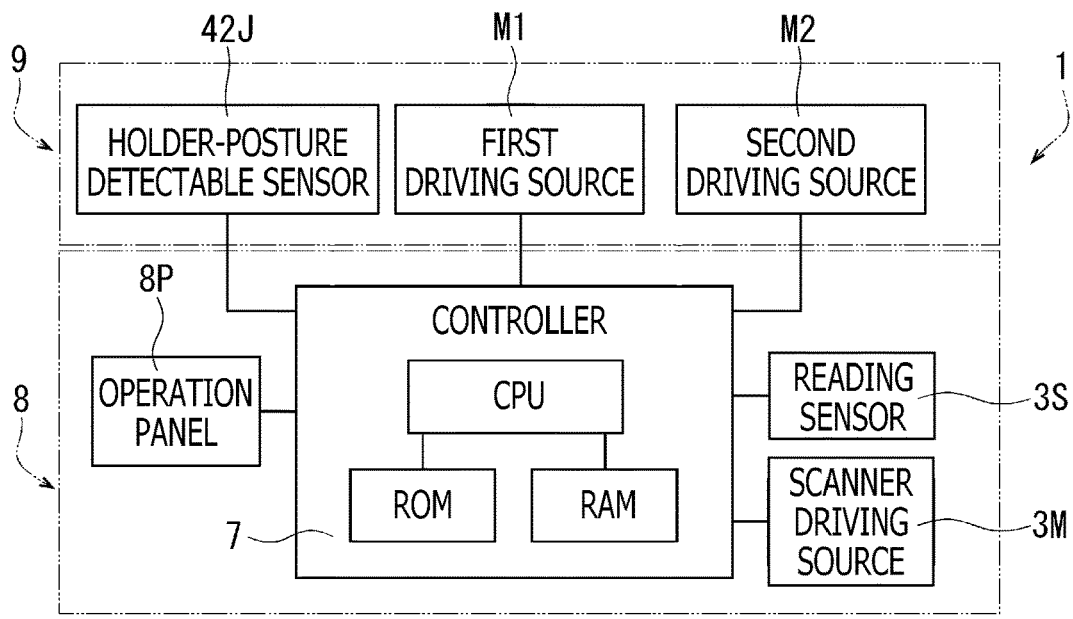
FIG. 2 is a block diagram to illustrate a configuration of the image reading apparatus according to the embodiment of the present disclosure.

As shown in FIG. 2, the second housing 8 stores a controller 7 therein. The controller 7 includes a microcomputer including, but not limited to, a CPU, a ROM, and a RAM. The ROM may store programs for controlling behaviors of the image forming apparatus 1 and for executing a variety of processes. The RAM may serve as a memory area to temporarily store data and signals, which may be used by the CPU to run the programs, and as a work area to process data. The controller 7 may control overall acts in the image reading apparatus 1 including the image forming unit 2, the reader unit 3, the automatic conveyer 4, and the operation panel 8P.

Figure 3:
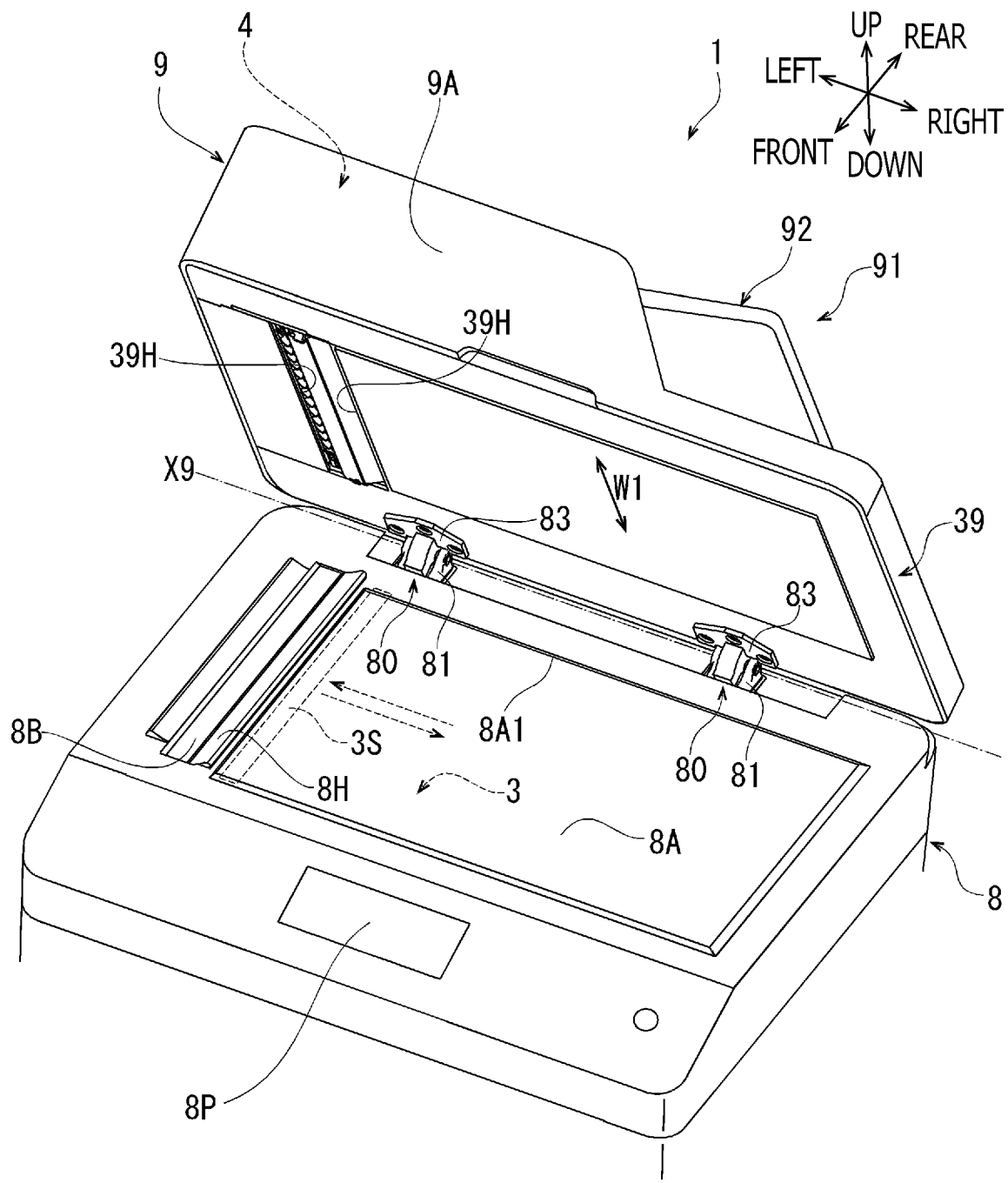
FIG. 3 is a perspective partial view of the image reading apparatus according to the embodiment of the present disclosure with a first housing at an open position.

As shown in FIGS. 3 and 4, on an upper side of the second housing 8, arranged is a platen glass. An upper surface of the platen glass provides a document supporting surface 8A, which occupies a larger area on the upper side of the second housing 8. Further, at a leftward position with respect to the document supporting surface 8A on the upper side of the second housing 8, arranged is another platen glass. An upper surface of the another platen glass provides a reader surface 8B extending longitudinally in the front-rear direction.

The document supporting surface 8A may support an original document from below when the reader unit 3 reads an image of the original document placed still on the document supporting surface 8A. The original document to be read may include, for example, a sheet, including paper and OHP film, and pages of a book.

The reader surface 8B may contact each of the sheets SH being conveyed one by one by the automatic conveyer 4 from below when the reader unit 3 reads images of the sheets SH. At a position on the upper side of the second housing 8 between the document supporting surface 8A and the reader surface 8B, arranged is a guiding protrusion 8H. The guiding protrusion 8H may guide the sheet SH being conveyed on the reader surface 8B to lift from the reader surface 8B and turn upper-rightward.

In the present embodiment, an object, whose image may be read by use of the document supporting surface 8A, may be called as an original document, and an object, whose image may be read while the object is being conveyed by the automatic conveyer 4, may be called as a sheet. An original document and a sheet may be substantially a same object. In other words, an original document may be used as a sheet, and a sheet may be used as an original document.

As shown in FIG. 3, the first housing 9 is swingably coupled to the second housing 8 to swing about an open/close axis X9 through two (2) hinges 80, which are arranged at a rear end area of the second housing 8. The open/close axis X9 extends in the crosswise direction, which is parallel to an edge 8A1 of the document supporting surface 8A.

Each of the hinges 80 includes a base part 81 and a supporting part 83. The base part 81 is held by a rear end part of the second housing 8 and swingably supports the supporting part 83 to swing about the open/close axis X9. The base part 81 may ascend from the second housing 8 when, for example, the original document supported on the document supporting surface 8A is a book having thickness, to adapt to the thickness. Moreover, the base part 81 contains springs and slider cams for serving as a torque hinge, by which the supporting part 83 may stay stationary at a desired swing angle. The supporting part 83 supports a rear end part of the first housing 9.

When the first housing 9 is located at a closed position, as shown in FIGS. 1 and 4, the first housing 9 covers the document supporting surface 8A and the reader surface 8B from above. As shown in FIG. 3, the first housing 9 may, with a frontward part thereof being moved to swing upper-rearward about the open/close axis 9A, move to an open position, in which the document supporting surface 8A and the reader surface 8B are exposed. With this swingable structure of the first housing 9, the user may place the original document being the object on the document supporting surface 8A.

In the following paragraphs, positional relation within the first housing 9 and each part or item contained in the first housing 9 will be mentioned on basis of the posture of the first housing 9 being at the closed position.

The reader unit 3 includes a reading sensor 3S, which is stored in an upper area in the second housing 8, as shown in FIGS. 2-4, a scanner driving source 3M, as shown in FIG. 2, and a scanner device to be driven by the scanner driving source 3M, which is not shown. The reading sensor 3S may be a known image reading sensor, such as a contact image sensor (CIS) or a charge coupled device (CCD).

As shown in FIGS. 3 and 4, the reading sensor 3S is located at a lower position with respect to the document supporting surface 8A and the reader surface 8B. The scanner device (not shown) is, in order to read an image of an original document supported on the document supporting surface 8A, driven by the scanner driving source 3M to move the reading sensor 3S to reciprocate in the crosswise direction in the area underneath the document supporting surface 8A in the second housing 8. On the other hand, in order to read an image of a sheet SH being conveyed by the automatic conveyer 4, the scanner device is driven by the scanner driving source 3M, and the reading sensor 3S is stopped at a position underneath the reader surface 3B in the second housing 8 so that the reader 3S staying still may read an image of a sheet SH being conveyed by the automatic conveyer 4. The position where the reading sensor 3S stops underneath the reader surface 3B is a predetermined stationary reading position.

<Configurations of Base Member, First Chute Member, Second Chute Member, and Cover Member>

As shown in FIG. 4, the first housing 9 includes a base member 39, a first chute member 35, a second chute member 37, and a cover member 38.

The base member 39 forms a bottom part of the first housing 9. A rightward part of the base member 39 forms the ejection tray 96, and in a leftward part of the base member 39, in a range coincident with the reader surface 8B and the guiding protrusion 8H, formed is a rectangular hole 39H.

A leftward part of the base member 39 with respect to the rectangular hole 39H forms a conveyer surface 39G1. A leftward part of the conveyer surface 39G1 curves to change an orientation thereof from downward to lower-rightward and extends to incline lower-rightward to a leftward edge of the rectangular hole 39H.

A rightward part of the base member 39 with respect to the rectangular hole 39H forms a conveyer surface 39G2. The conveyer surface 39G2 inclines upper-rightward from a position adjacent to the guiding protrusion 8H.

The second chute member 37 is arranged at an upper position with respect to the leftward part of the base member 39. The second chute member 37 is formed to have a pressing-member retainer 37F and guiding surfaces 37G1, 37G2.

The pressing-member retainer 37F is a recessed portion formed to recess upward at a position to face the reader surface 8B. The pressing-member retainer 37F retains a pressing member 37P movably. The pressing member 37P may press the sheet SH being conveyed on the reader surface 8B from above and restrain the sheet SH from being separated from the reader surface 8B.

The guiding surface 37G1 is located at a position leftward with respect to the pressing member retainer 37F. A leftward part of the guiding surface 37G1 curves along the leftward part of the conveyer surface 39G1 in the base member 39. Moreover, the guiding surface 37G1 inclines lower-rightward along the lower-rightward inclination of the conveyer surface 39G1 in the base member 39.

The guiding surface 37G2 is located at a position rightward with respect to the pressing-member retainer 37F. The guiding surface 37G2 inclines upper-rightward along the inclination of the guiding protrusion 8H in the second housing 8 and the conveyer surface 39G2 in the base member 39.

The first chute member 35 is arranged at an upper position with respect to the second chute member 37. The first chute member 35 is formed to have a conveyer surface 36 and a restrictive surface 60.

The conveyer surface 36 is located on a downstream side of the feed tray 91 in the conveying direction D1 and extends upper-leftward. An upstream end of the conveyer surface 36 in the conveying direction D1, i.e., a rightward end of the conveyer surface 36, forms a conveyer edge 36E. A leftward end of the conveyer surface 36 curves to change an orientation thereof from leftward to downward.

The restrictive surface 60 extends downward from the conveyer edge 36E of the conveyer surface 36 in a direction intersecting with the conveying direction D1. The restrictive surface 60 may contact leading edges of the sheets SH supported on the feed tray 91. A lower end 60E of the restrictive surface 60 is located at a position lower and rightward with respect to the conveyer edge 36E of the conveyer surface 36.

The cover member 38 is arranged at an upper position with respect to the first chute member 35. The cover member 38 includes a plurality of ribs 38R that protrude downward, and lower edges of the ribs 38R form a guiding surface 38G, which virtually spreads along the lower edges of the ribs 38R. In other words, the cover member 38 includes the guiding surface 38G. A rightward part of the guiding surface 38G faces the conveyer surface 36 from above at a position displaced leftward from the conveyer edge 36E of the conveyer surface 36 in the first chute member 35. The guiding surface 38G extends to incline leftward and moderately upward along the conveyer surface 36 in the first chute member 35. A leftward part of the guiding face 38G curves along the leftward part of the conveyer surface 36 in the first chute member 35.

The conveyer surface 36 and the restrictive surface 60 in the first chute member 35, the guiding face 38G in the cover member 38, the conveyer surfaces 39G1, 39G2 in the base member 39, and the guiding surfaces 37G1, 37G2 in the second chute member 37 form a conveyance guide 30. The conveyance guide 30 is accommodated in the first housing 9.

The conveyer surfaces 36, 39G1, 39G2, and the guiding surfaces 38G, 37G1, 37G2 extend along the conveying direction D1 and define a conveyer path, in which the sheets SH are conveyed from the feed tray 91 to the ejection tray 96.

As shown in FIGS. 1 and 6-9, when the first housing 9 is in the closed position, a widthwise direction W1 of the conveyance guide 30 coincides with the front-rear direction. The widthwise direction W1 intersects orthogonally with the open/close axis X9.

Figure 6:
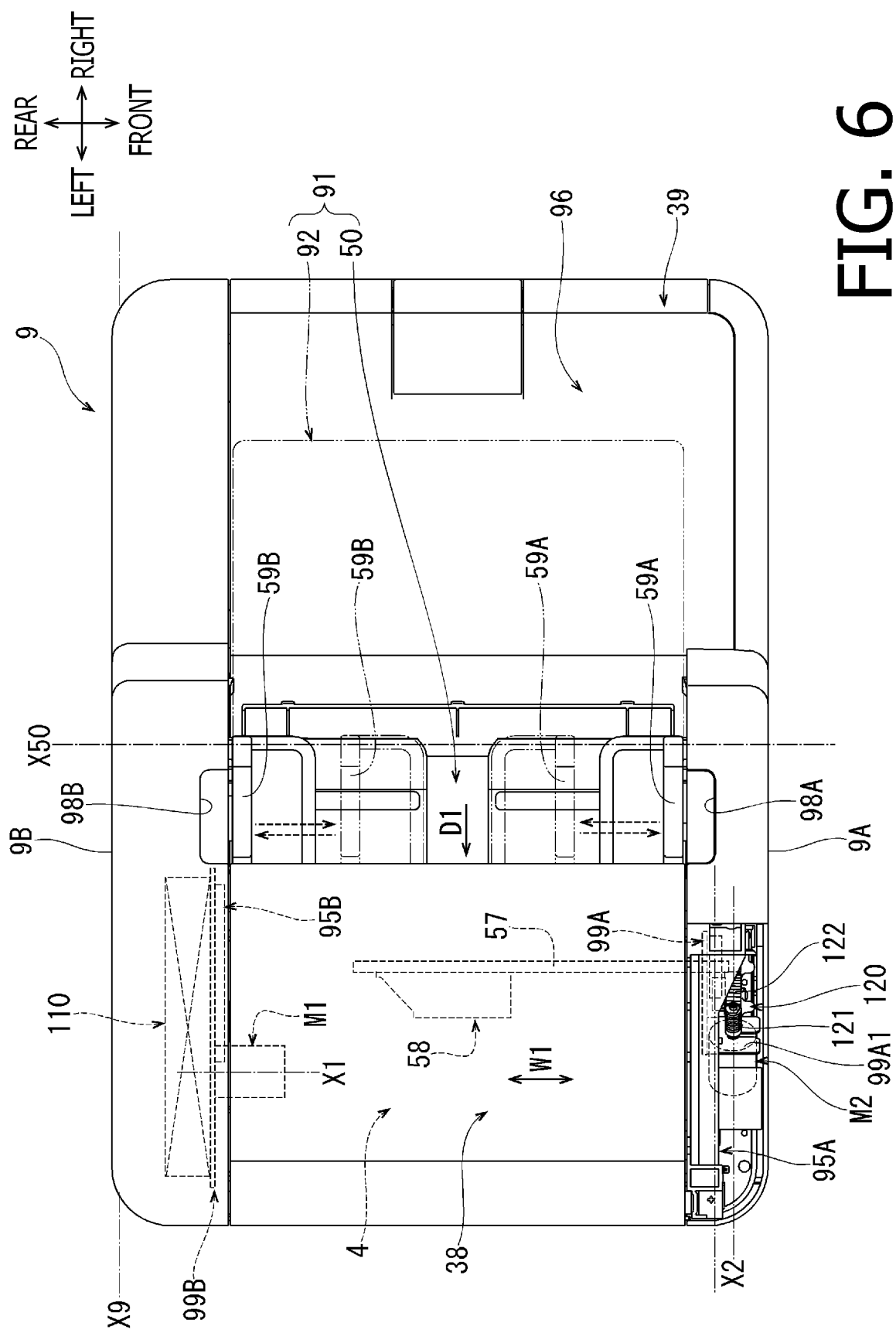
FIG. 6 is a top plan view of the first housing of the image forming apparatus according to the embodiment of the present disclosure.

As shown in FIGS. 1 and 6, the first housing 9 has a front face 9A and a rear face 9B. The front face 9A and the rear face 9B face away opposite to each other in the widthwise direction W1 of the conveyance guide 30. The front face 9A is located on a side of the first housing 9 opposite to the open/close axis X9 and spreads in the vertical and crosswise directions. The rear face 9B is located on the same side of the first housing 9 as the open/close axis X9 and spreads in the vertical and crosswise directions.

Figure 7:
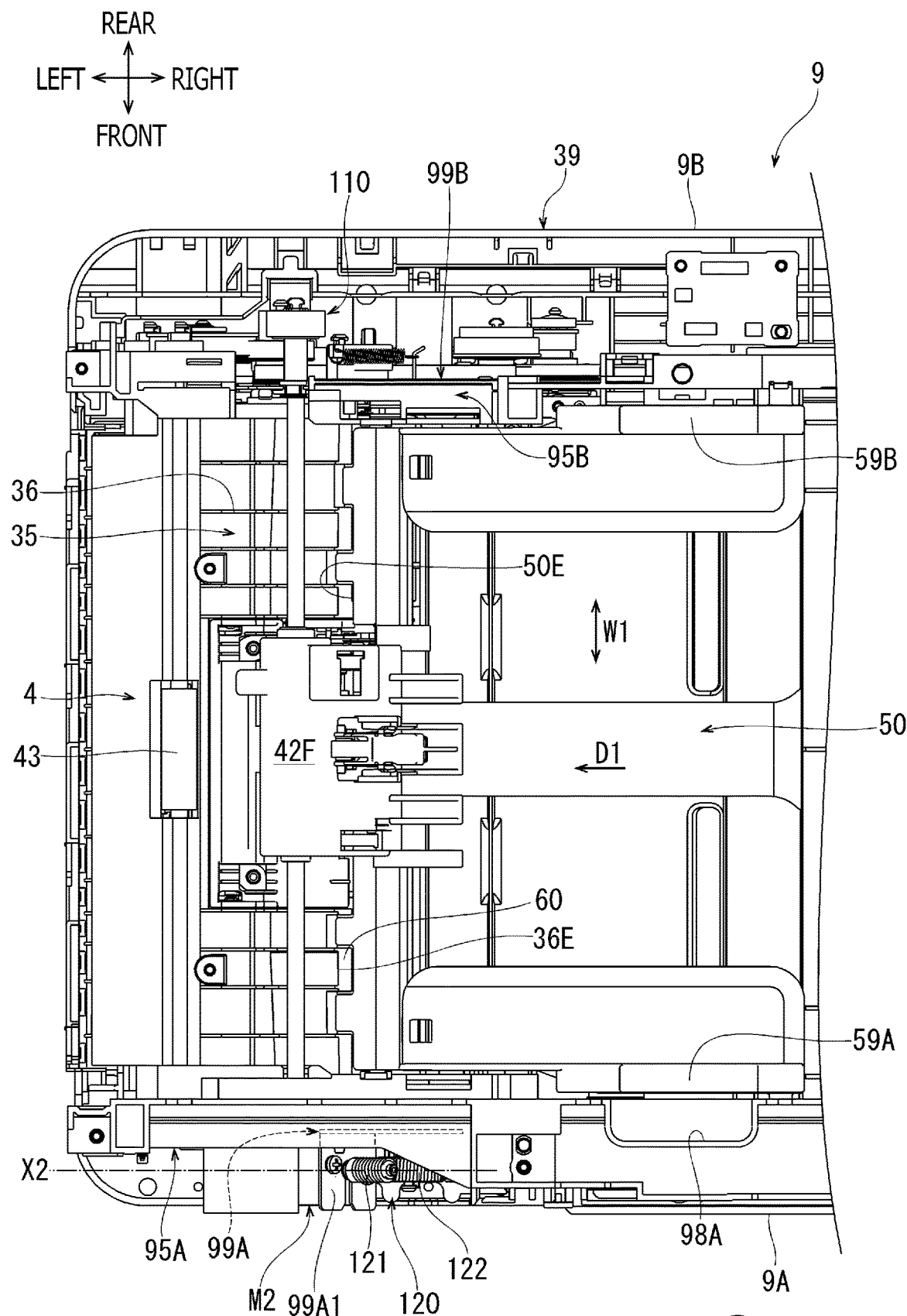
FIG. 7 is a plan view of the first housing, with a cover member being removed, in the image forming apparatus according to the embodiment of the present disclosure.
Figure 8:
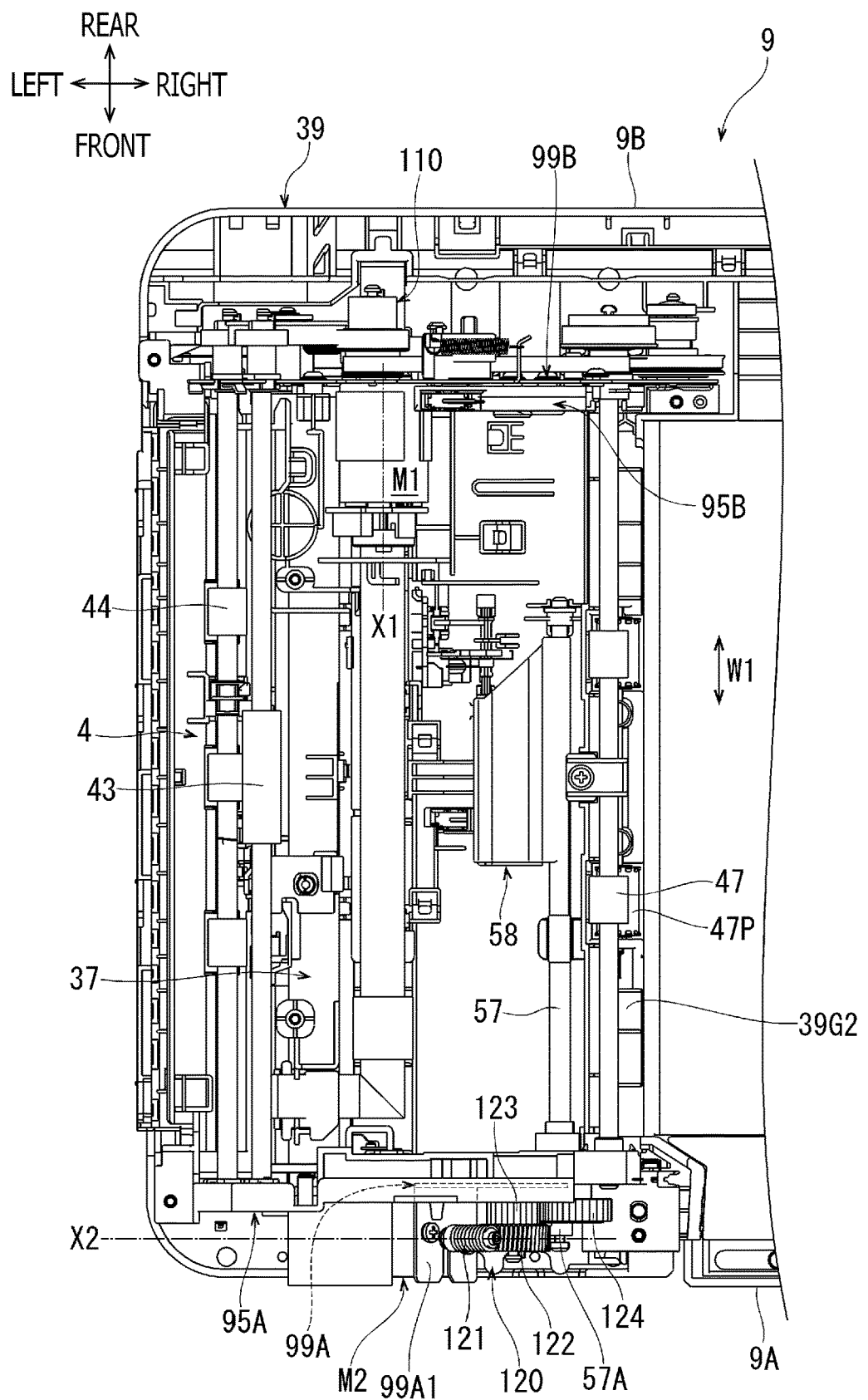
FIG. 8 is a plan partial view of the first housing, with the cover member, a first chute member, and a movable plate being removed, in the image forming apparatus according to the embodiment of the present disclosure.
Figure 9:
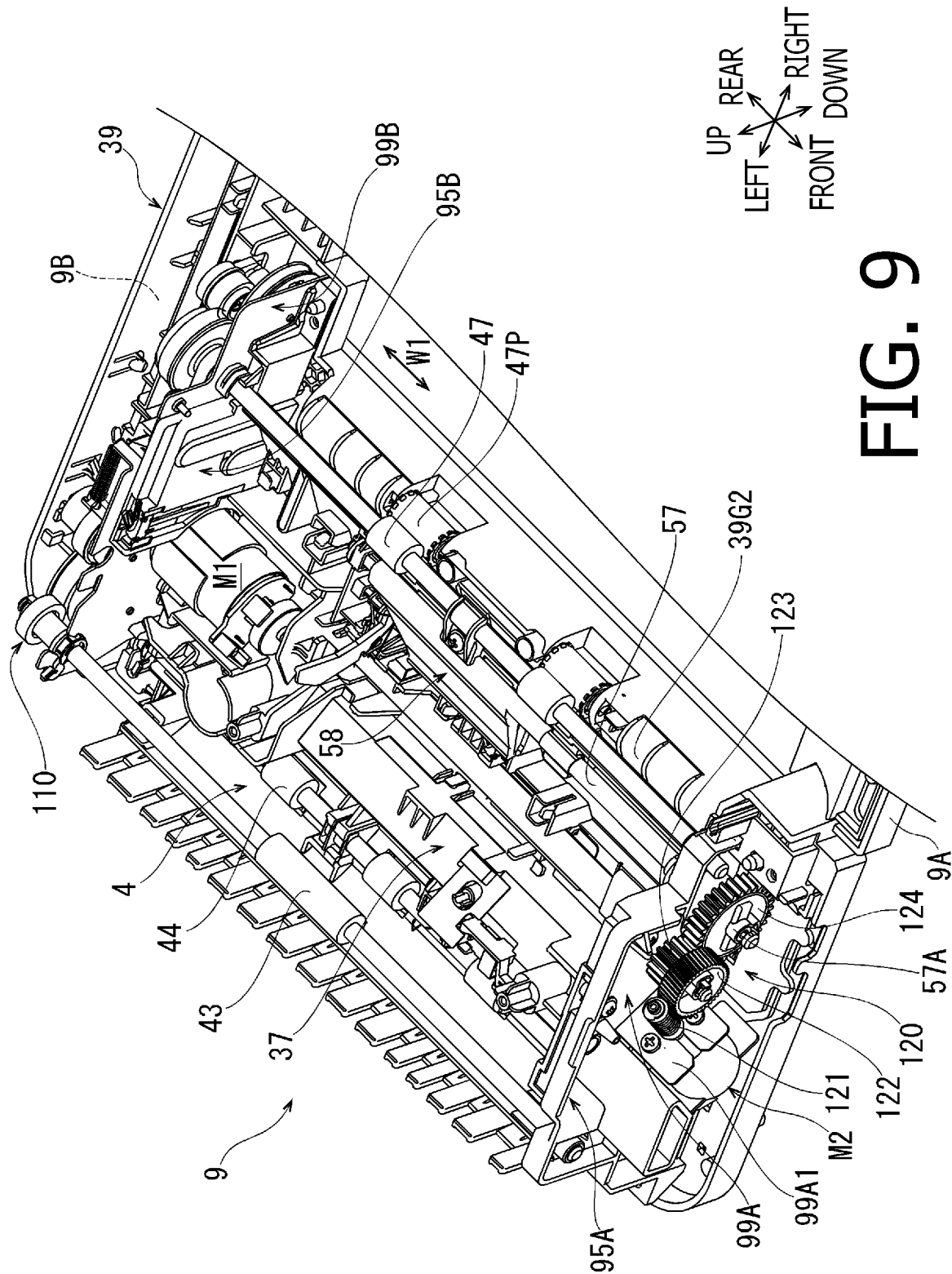
FIG. 9 is a perspective partial view of the first housing, with the cover member, the first chute member, and the movable plate being removed, in the image forming apparatus according to the embodiment of the present disclosure.
Figure 10:
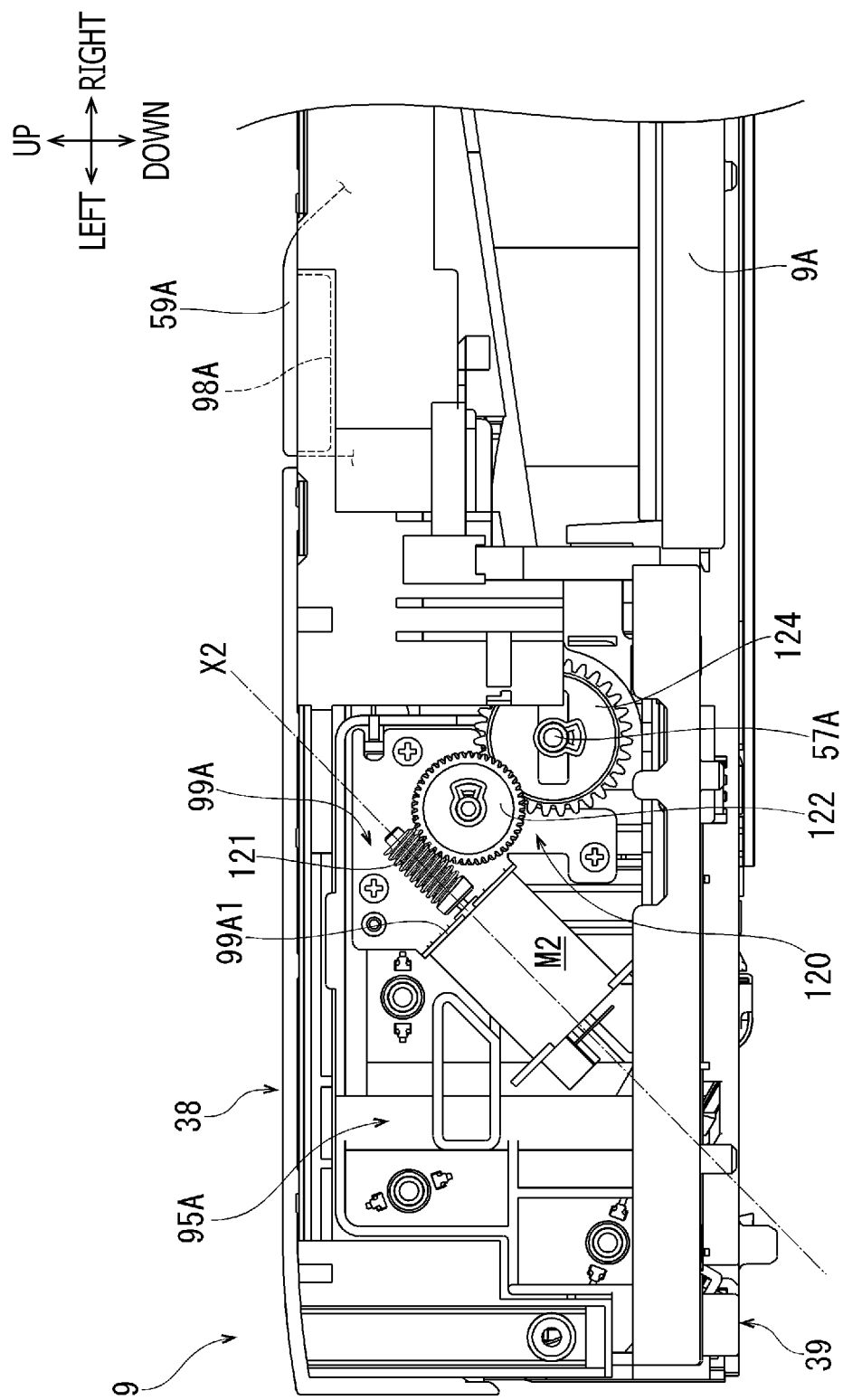
FIG. 10 is a front partial view of the first housing, with an exterior wall on a front side being removed, in the image reading apparatus according to the embodiment of the present disclosure.

In FIG. 6, a part of an exterior wall of the first housing 9 on a side toward the front face 9A is not shown. In FIG. 7, parts of exterior walls of the first housing 9 on the side toward the front face 9A and on the side toward the rear face 9B, and the cover member 38 are not shown. In FIGS. 8 and 9, a part of the exterior wall of the first housing 9 on the side toward the front face 9A, a part of the exterior wall of the first housing 9 on the side toward the rear face 9B, the cover member 38, the first chute member 35, and a movable plate 50 are not shown. In FIG. 10, a part of the exterior wall of the first housing 9 on the side toward the front face 9A is now shown.

As shown in FIGS. 6-10, the first housing 9 includes a side frame 95A and a metal plate 99A, a side frame 95B, and a metal plate 99B. The side frame 95A and the metal plate 99A may be referred to as the metal plate 99A and the metal plate 99A on the front. The side frame 95B and the metal plate 99B may be referred to as the side frame 95B and the metal frame 99B on the rear.

The side frame 95A and the metal plate 99A on the front are located on a side toward the front face 9A of the first housing 9 frontward side frame 95A. In other words, the side frame 95A and the metal plate 99A are located at positions closer to the front face 9A of the first housing 9 and farther from the rear face 9B. The side frame 95A and the metal plate 99A extend in the crosswise direction along the front face 9A. The metal plate 99A is fastened to the side frame 95A integrally by, for example, screws.

The side frame 95B and the metal plate 99B on the rear are located on a side toward the rear face 9B of the first housing 9. In other words, side frame 95B and the metal plate 99B on the rear are located at positions closer to the rear face 9B of the first housing 9 and farther from the front face 9A. The side frame 95B and the metal plate 99B on the rear extend in the crosswise direction along the rear face 9B. The metal plate 99B is fastened to the side frame 95B integrally by, for example, screws.

A pair of the side frame 95A and the metal plate 99A on the front and a pair of the side frame 95B and the metal plate 99B on the rear face each other in the in the widthwise direction W1, with the conveyance guide 30 interposed there-between.

<Configuration of Feed Tray>

As shown in FIGS. 1 and 4, the feed tray 91 is arranged at an upper position with respect to the ejection tray 96 to vertically overlap the ejection tray 96.

The feed tray 91 includes a feed tray body 92 and the movable plate 50. The feed tray body 92 extends from a rightward area in the first housing 9 to incline moderately lower-leftward. The movable plate 50 is arranged to adjoin a leftward end portion of the feed tray body 92. The movable plate 50 extends substantially in a plane toward the restrictive surface 60 in the first chute member 35.

A leftward part of the movable plate 50 is covered by a rightward part of the cover member 38 from above. The feed tray 91 supports the sheets SH to be fed to the automatic conveyer 4 on the feed tray body 92 and the movable plate 50. As shown in FIGS. 4 and 5, the movable plate 50 is pivotable about a pivot axis X50, which extends in the front-rear direction.

At a lower position with respect to the movable plate 50, arranged is a link lever 58. As shown in FIGS. 8 and 9, the link lever 58 is arranged at a position, at which the link lever 58 may contact a central part of the movable plate 50 in the widthwise direction W1. A pivot shaft 57 of the link lever 58 extends frontward, and a frontward end 57A of the link lever 58 protrudes frontward with respect to the side frame 95 and the metal plate 99A on the front.

As shown in, for example, FIGS. 9 and 10, the automatic conveyer 4 includes a second driving source M2 and a second driving train 120. The second driving source M2 and the second driving train 120 are accommodated in the first housing 9 on a side toward the front face 9A, in other words, in an area closer to the front face 9A and farther from the rear face 9B. The second driving source M2 is supported by a bent piece 99A1, which is a part of the metal plate 99A on the front bending frontward. The second driving train 120 is supported by the side frame 95A and the metal plate 99A on the front. As shown in FIG. 8, the second driving source M2 and the second driving train 120 are arranged at positions in an area between the front face 9A of the first housing 9 and the pair of the side frame 95 and the metal plate 99A in the widthwise direction W1.

The second driving source M2 is rotatable bidirectionally, i.e., in a normal direction or a reverse direction, under the control of the controller 7 to produce a driving force. The second driving source M2 may be a direct current motor, and when the second driving source M2 is not powered, a retaining force to a driving shaft of the second driving source M2 is not maintained.

As shown in FIG. 8, a driving axis X2 of the second driving source M2 extends in a direction orthogonal to the widthwise direction W1. As shown in FIG. 10, the driving axis X2 of the second driving source M2 inclines with respect to the vertical direction and a horizontal direction in a view along the widthwise direction W1, i.e., the front-rear direction.

As shown in, for example, FIGS. 9 and 10, the second driving train 120 includes a worm gear 121, a worm wheel gear 122, and spur gears 123, 124.

The worm gear 121 is fixed to the driving shaft of the second driving source M2 to rotate integrally with the driving shaft. The worm wheel gear 122 meshes with the worm gear 121. The spur gear 123 is formed at a rearward side of the worm gear 121 to rotate integrally with the worm gear 121. The spur gear 124 is fixed to the frontward end 27A of the pivot shaft 57 of the link lever 58 to rotate integrally with the pivot shaft 57. The spur gear 124 meshes with the spur gear 123.

As the second driving source M2 rotates in the normal direction, the driving force from the second driving source M2 may be transmitted to the link lever 58 through the second driving train 120. Thereby, the link lever 58 may pivot upward and push the movable plate 50 upward. Accordingly, the movable plate 50 may pivot about the pivot axis X50 to move upward from the position shown in FIG. 4 to the position shown in FIG. 5.

On the other hand, when the second driving source M2 rotates in the reverse direction, the driving force from the second driving source M2 may be transmitted to the link lever 58 through the second driving train 120. Thereby, the link lever 58 may pivot downward, and the movable plate 50 accompanying with the link lever 58 may descend. Accordingly, the movable plate 50 may pivot about the pivot axis X50 to move downward from the position shown in FIG. 5 to the position shown in FIG. 4.

When the second driving source M2 stops rotating under the control of the controller 7, the retaining force to the driving shaft of the second driving source M2 is discontinued. Therefore, the weight of the movable plate 50 may be transmitted to the worm wheel gear 122 and the worm gear 121 through the link lever 58, the spur gear 124, and the spur gear 123; and the worm gear 121 and the worm wheel gear 122 may be interlocked. Therefore, the movable plate 50 may be maintained at the position without descending.

The movable plate 50 includes a facing end 50E. The facing end 50E forms an end of the movable plate 50 on a downstream side in the conveying direction D1 and faces the restrictive face 60.

When the movable plate 50 is at the position shown in FIG. 4, the facing end 50E faces a part of the restrictive face 60 closer to the lower end 60E; and when the movable plate 50 is at a position shown in FIG. 5, the facing end 50E faces another part of the restrictive face 60 closer to the conveyer edge 36E of the conveyer surface 36. In other words, the facing end 50E continues facing the restrictive surface 60 regardless of the pivoting movements of the movable plate 50.

As shown in FIGS. 1 and 6, on the movable plate 50, arranged are two (2) width-restrictive guides 59A, 59B, which are slidable in the front-rear direction. The width-restrictive guides 59A, 59B, which are located frontward and rearward, respectively, may be moved to be closer to or farther from each other in the widthwise direction W1 so that the width-restrictive guides 59A, 59B may flank the sheets SH to support the sheets SH on the feed tray 91 steadily, regardless of the width of the sheets SH, at a position centered about the center of the feed tray 91 in the widthwise direction W1.

In an area on the upper face of the first housing 9 between the width-restrictive guide 59A on the front and the front face 9A in the widthwise direction W1, formed is a shelter portion 98A. The shelter portion 98A recesses frontward toward the front face 9A and away from the width-restrictive guide 59A and dents downward.

In an area on the upper face of the first housing 9 between the width-restrictive guide 59B on the rear and the rear face 9B in the widthwise direction W1, formed is a shelter portion 98B. The shelter portion 98B recesses rearward toward the rear face 9B and away from the width restrictive guide 59B and dents downward.

With the shelter portions 98A, 98B, a user may pinch the width-restrictive guides 59A, 59B with fingers and slidably move the width restrictive guides 59A, 59B in the widthwise direction W1 to a maximum extent.

As shown in FIG. 6, the second driving source M2 is arranged at a position to partly coincide with the shelter portion 98A on the front in the widthwise direction W1. Moreover, the second driving train 120 is arranged at a position to partly coincide with the shelter portion 98A on the front in the widthwise direction W1.

<Configurations of Feed Roller, Separation Roller, First and Second Conveyer Rollers, and Ejection Roller>

As shown in FIG. 4, the automatic conveyer 4 includes, for conveying the sheets SH along the conveyance guide 30, a feed roller 41, a separation roller 42, a separation pad 42A, a first conveyer roller 43, a first pinch roller 43P, a second conveyer roller 44, a second pinch roller 44P, an ejection roller 47, and an ejection pinch roller 47P.

The feed roller 41, the separation roller 42, the separation pad 42A, the first conveyer roller 43, the first pinch roller 43P, the second conveyer roller 44, the second pinch roller 44P, the ejection roller 47, and the ejection pinch roller 47P are accommodated in the first housing 9.

As shown in FIGS. 8 and 9, the automatic conveyer 4 includes a first driving source M1 and a first driving train 110. The first driving source M1 and the first driving train 110 are accommodated in the first housing 9 on a side toward the rear face 9B, i.e., in an area closer to the rear face 9B and farther from the front face 9A.

The first driving source M1 is located at a position on a same side of the side frame 95B and the metal plate 99B on the rear as the conveyance guide 30, in other words, at a frontward position with respect to the side frame 95B and the metal plate 99B on the rear, and is supported by the metal plate 99B on the rear. As shown in FIGS. 6 and 8, a driving axis X1 of the first driving source M1 extends in the widthwise direction W1, i.e., the front-rear direction.

As shown in FIG. 4, the conveyance guide 30, including the conveyer surface 36, the guiding surface 38B, the conveyer surfaces 39G1, 39G2, and the guiding surfaces 37G1, 37G2, includes an approximately U-shaped portion, at which the conveyance guide 30 extended leftward from the feed tray 91 curves downward and turns leftward. Meanwhile, the first driving source M1 is arranged inside the curvature of the U-shaped portion.

As shown in, for example, FIGS. 8 and 9, the first driving train 110 is located on a side of the side frame 95 and the metal plate 99B on the rear opposite to the conveyance guide 30, in other words, on a rearward side of the side frame 95 and the metal plate 99B, and is supported by the side frame 95B and the metal plate 99B.

A quantity of gears in the first driving train 110 is substantially larger than a quantity of gears in the second driving train 120. Therefore, the first driving source M1 employs a larger direct current motor than the second driving source M2. As a result, the first driving source M1 and the first driving train 110 are substantially heavier than the second driving source M2 and the second driving train 120.

The first driving source M1 may rotate and produce a driving force under the control of the controller 7. The first driving train 110 includes a plurality of gears and may transmit the driving force from the first driving source M1 to the feed roller 41, the separation roller 42, the first conveyer roller 43, the second conveyer roller 44, and the ejection roller 47.

As shown in FIG. 4, the separation roller 42 is arranged at a position on a downstream side with respect to the conveyer edge 36E of the conveyer surface 36 in the first chute member 35 in the conveying direction D1 and an upper position with respect to the conveyer surface 36. A rotation shaft 42S of the separation roller 42 supports a holder 42F pivotably. The holder 42F is arranged to extend rightward from the rotation shaft 42S over the conveyer edge 36E of the conveyer surface 36.

The feed roller 41 is retained rotatably at a rightward portion of the holder 42F. The feed roller 41 is arranged at a position to face the movable plate 50 from above. The rotation shaft 42S and gears, which are not shown, in the holder 42F may transmit the driving force from the first driving source M1 to the feed roller 41 to rotate the feed roller 41 in a direction, in which the sheets SH on the feed tray 91 may be conveyed toward the conveyer surface 36 in the conveyance guide 30. The feed roller 41 is movable in the vertical direction along with pivoting movements of the holder 42F.

As shown in FIGS. 4 and 5, in the first housing 9, arranged is a holder-posture detectable sensor 42J. The holder-posture detectable sensor 42J may detect whether a posture of the holder 42F is within a predetermined range and transmit the detected result to the controller 7.

In particular, the holder-posture detectable sensor 42J may detect a posture of the holder 42F when a lower end of the feed roller 41 contacts an uppermost sheet SH in the sheets SH on the feed tray 91; thereby, the holder-posture detectable sensor 42J may indirectly detect whether a difference in height between the uppermost sheet SH and the conveyer edge 36E of the conveyer surface 36 is in a correct range, in which the upper most sheet SH may be forwarded to the conveyer surface 36 without colliding with the conveyer edge 36E.

The holder 42F shown in FIGS. 4 and 5 is an exemplary posture being in a predetermined range. When the holder 42F is in this posture, a height difference between the uppermost sheet SH in the sheets SH on the feed tray 91 and the conveyer edge 36E of the conveyer surface 36 is in the correct range. Therefore, the feed roller 41 may feed the uppermost sheet SH to the conveyer surface 36 toward a position between the separation roller 42 and the separation pad 42A.

As shown in FIG. 4, the separation pad 42A is supported by the first chute member 35 at a position directly below the separation roller 42 in an arrangement to be exposed from the conveyer surface 36. The separation pad 42A is urged toward the separation roller 42.

The separation roller 42 may apply a conveying force directed downstream in the conveying direction D1 to the sheet SH reaching a nipping position between the separation roller 42 and the separation pad 42A. The separation pad 42A may, when two or more sheets SH are conveyed to the nipping position, apply a force to stop the conveyance to the sheet(s) SH other than the sheet SH that contacts the separation roller 42.

The first conveyer roller 43 is supported by the first chute member 35, at an intermediate position in the conveyer surface 36 in the conveying direction D1. The first pinch roller 43P is supported by the cover member 38 at a position on the guiding surface 38G and is urged toward the first conveyer roller 43. The first roller 43 may, together with the first pinch roller 43P, nip the sheet SH separated from the other sheets SH by the separation roller 42 and the separation pad 42A and convey the separated sheet SH toward the second conveyer roller 44 and the second pinch roller 44P.

The second conveyer roller 44 is supported by the second chute member 37, at an intermediate position in the guiding surface 37G1 in the conveying direction D1. The second pinch roller 44P is supported by the base member 39 at a position on the conveyer surface 39G1 and is urged toward the second conveyer roller 44. The second roller 44 may, together with the second pinch roller 44P, nip the sheet SH conveyed by the first conveyer roller 43 and the first pinch roller 43P and convey the sheet SH toward the reader surface 8B, i.e., toward the reading sensor 3S staying still at the stationary reading position.

The ejection roller 47 is supported by the second chute member 37 at a position in a rightward end area in the guiding surface 37G2. The ejection pinch roller 47P is supported by the base member 39 at a position in a rightward end area in the conveyer surface 39G2 and is urged toward the ejection roller 47. The ejection roller 47 may, together with the ejection pinch roller 47P, nip the sheet SH passing over the reader surface 8B and being guided by the conveyer surface 39 and the guiding surface 37G2 and eject the sheet SH at the ejection tray 96.

<Image Reading Action>

When the image reading apparatus 1 described above reads an image of an original document supported on the document supporting surface 8A, the controller 7 controls the scanner driving source 3M in the reader unit 3 to operate the scanner device, which is not shown, to move the reading sensor 3S in the crosswise direction from a read-start position located underneath a leftward edge of the document supporting surface 8A to a read-end position located underneath a rightward edge of the document supporting surface 8A. Meanwhile, the reading sensor 3S reads an image of the original document supported on the document supporting surface 8A. Thereafter, the controller 7 controls the scanner driving source 3M in the reader unit 3 to operate the scanner device to move the reading sensor 3S that finished reading in a reverse direction to move from the rightward end to the leftward end and return to a standby position.

Moreover, the image reading apparatus 1 may convey the sheet SH supported on the feed tray 91 through the automatic conveyer 4 and read an image of the sheet SH being conveyed. In particular, the controller 7 controls the scanner driving source 3M of the reader unit 3 to operate the scanner device to place the reading sensor 3S at the stationary reading position located underneath the reader surface 8B.

Next, the controller 7 determines whether the posture of the holder 42H is in the predetermined range, which may be, for example, as shown in FIG. 4.

If the posture of the holder 42F is not in the predetermined range, the controller 7 determines that the height difference between the uppermost sheet SH in the sheets SH on the feed tray 91 and the conveyer edge 36E of the conveyer surface 36 is outside the correct range. Therefore, the controller 7 controls the second driving source M2 to rotate in the normal direction to move the link lever 58 to pivot upward so that the movable plate 5 may be moved upward until the posture of the holder 42F falls in the predetermined range.

Next, the controller 7 operates the first driving source M1 to drive the feed roller 41, the separation roller 42, the first conveyer roller 43, the second conveyer roller 44, and the ejection roller 47 to convey the sheets SH on the feed tray 91 one by one along the conveyance guide 30.

When the sheet SH being conveyed on the conveyer surfaces 36, 39G1, 39G2 passes over the reader surface 8B, the controller 7 controls the reading sensor 3S staying still at the stationary reading position to read the image of the sheet SH. Thereafter, the controller 7 controls the sheet SH, whose image has been read, to be conveyed by the ejection roller 47 and the ejection pinch roller 47P and ejected at the ejection tray 96.

While the sheet SH is being ejected, the controller 7 controls the second driving source M2 to rotate intermittently, based on signals from the holder-posture detectable sensor 42J and the reduced amount of the sheets SH on the feed tray 91, to cause the movable plate 50 to pivot upward little by little in small motions so that the posture of the holder 42F may be maintained in the predetermined range.

After the amount of the sheets SH on the feed tray 91 is reduced, as shown in FIG. 5, and when no further sheet SH remains on the feed tray 91, the controller 7 stops the first driving source M1 and the second driving source M2 to terminate the image reading action.

Thereafter, the controller 7 controls the scanner driving source 3M in the reader unit 3 to operate the scanner device to move the reading sensor 3S to return to the standby position. Moreover, the controller 7 controls the second driving source M2 to rotate in the reverse direction to move the link lever 58 to pivot downward so that the movable plate 50 may return to the position shown in FIG. 4.

<Benefits>

According to the image reading apparatus 1 in the embodiment described above, as shown in FIGS. 6-10, the first driving source M1 and the first driving train 110 arranged on the side toward the rear face 9B and the second driving source M2 and the second driving train 120 arranged on the side toward the front face 9A are distributed to the rearward side and the frontward side, respectively, in the first housing 9. Therefore, in the area toward the rear face 9B in the first housing 9, a space to accommodate the first driving source M1 and the first driving train 110 may be reserved easily, and in the area toward the front face 9A in the first housing 9, a space to accommodate the second driving source M2 and the second driving train 120 may be reserved easily.

Therefore, the freedom of layout to arrange the first driving source M1, the first driving train 110, the second driving source M2, and the second driving train 120 may be improved.

Moreover, in the image reading apparatus 1 in the embodiment described above, as shown in FIG. 3, the first housing 9 is swingably coupled to the second housing 8 through the hinges 80 to swing about the open/close axis X9 between the closed position and the open position. Meanwhile, the rear face 9B, toward which the first driving source M1 and the first driving train 110 are arranged, is located on the same side, i.e., the rear side, as the open/close axis X9 in the first housing 9. On the other hand, the front face 9A, toward which the second driving source M2 and the second driving train 120 are arranged, is located on the opposite side of the first housing 9 from the open/close axis X9. In this regard, the first driving source M1 and the first driving train 110, which are heavier than the second driving source M2 and the second driving train 120, may be arranged in the area closer to the hinges 80. Therefore, when the first housing 9 is moved to swing between the closed position and the open position, deformation of the base member 39 and the other members in the first housing 9 may be restrained. As a result, the first housing 9 may be restrained from being damaged.

Moreover, in the image reading apparatus 1 in the embodiment described above, as shown in FIG. 6, the driving axis X2 of the second driving source M2 extends in the direction orthogonal to the widthwise direction W1. Therefore, a volume of the second driving source M2 may be restrained from increasing, and the space to arrange the second driving source M2 on the side toward the front face 9A in the first housing may be reduced in the widthwise direction W1.

Moreover, in the image reading apparatus 1 in the embodiment described above, as shown in FIG. 10, in the view along the widthwise direction W1, i.e., the front-rear direction, the driving axis X2 of the second driving source M2 inclines with respect to the vertical direction and to the horizontal direction. Therefore, the volume of the second driving source M2 may be restrained from increasing in the vertical and horizontal directions, and the space to arrange the second driving source M2 on the side toward the front face 9A in the first housing 9 may be reduced in the vertical direction and the horizontal direction.

Moreover, in the image reading apparatus 1 in the embodiment described above, as shown in FIG. 6, the second driving source M2 is arranged to partly coincide in the widthwise direction W1 with the shelter portion 98A on the front. Further, the second driving train 120 is arranged to partly coincide in the widthwise direction W1 with the shelter portion 98A. According to this arrangement, with use of the space to arrange the shelter portion 98A on the front, the space to arrange the second driving source M2 and the second driving train 120 may be reserved easily.

Moreover, in the image reading apparatus 1 in the embodiment described above, as shown in FIGS. 8 and 9, the first driving source M1 is located at a position on the same side of the side frame 95B and the metal plate 99B on the rear as the conveyance guide 30, in other words, at the frontward position with respect to the side frame 95B and the metal plate 99B on the rear, and is supported by the metal plate 99B on the rear. Meanwhile, the first driving train 110 is located on the side of the side frame 95 and the metal plate 99B on the rear opposite to the conveyance guide 30, in other words, on the rearward side of the side frame 95 and the metal plate 99B, and is supported by the side frame 95B and the metal plate 99B. Thus, while the first driving source M1 tends to be increased in its volume in the widthwise direction W1, with the arrangement of the first driving source M1 located at the position on the side of the side frame 95B and the metal plate 99B toward the conveyance guide 30, the distance between the rear face 9B of the first housing 9 and the side frame 95B or the metal plate 99B on the rear in the widthwise direction W1 may be reduced.

Moreover, in the image reading apparatus 1 in the embodiment described above, as shown in FIG. 4, the conveyance guide 30, including the conveyer surface 36, the guiding surface 38G, the conveyer surfaces 39G1, 39G2, and the guiding surfaces 37G1, 37G2, has the approximately U-shaped portion, at which the conveyance guide 30 extended leftward from the feed tray 91 curves downward and orients leftward. Meanwhile, the first driving source M1 is arranged inside the curvature of the U-shaped portion. Therefore, the space to arrange the first driving source M1 on the side of the rearward side frame 95B and the rearward metal plate 99B toward the conveyance guide 30 may be reserved easily.

Although an example of carrying out the invention has been described, those skilled in the art will appreciate that there are numerous variations and permutations of the image reading apparatus that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, the image reading apparatus may not necessarily be a single-functioned image reading apparatus but may be included in a multifunction peripheral machine having a plurality of image processing functions.

What is claimed is:

1. A sheet conveying apparatus, comprising:
 a feed tray configured to support sheets for being fed, the feed tray comprising a movable plate configured to move vertically according to an amount of the sheets supported by the feed tray;
 a conveyance guide configured to guide the sheets conveyed from the feed tray;
 a conveyer configured to convey the sheets supported by the feed tray along the conveyance guide;
 a first housing accommodating at least the conveyance guide and the conveyer, the first housing comprising a first outer face and a second outer face facing opposite to each other in a widthwise direction of the conveyance guide;
 a width-restrictive guide arranged movably on the movable plate;
 a first driving source accommodated in the first housing on a side toward the first outer face, the first driving source being configured to produce a driving force;
 a first driving train accommodated in the first housing on the side toward the first outer face, the first driving train being configured to transmit the driving force from the first driving source to the conveyer;

a second driving source accommodated in the first housing on a side toward the second outer face, the second driving source being configured to produce a driving force; and a second driving train accommodated in the first housing on the side toward the second outer face, the second driving train being configured to transmit the driving force from the second driving source to the movable plate, wherein the first housing comprises a recessed portion formed in an area on an upper face thereof between the width-restrictive guide and the second outer face in the widthwise direction, and wherein the second driving source and the second driving train are arranged at positions coincident with the recessed portion in the widthwise direction.

2. The sheet conveying apparatus according to claim 1, wherein the recessed portion is formed to recess toward the second outer face away from the width-restrictive guide.

3. The sheet conveying apparatus according to claim 1, further comprising:

a reading sensor configured to read images of the sheets conveyed along the conveyance guide;

a second housing arranged at a position lower than the first housing, the second housing accommodating the reading sensor, the second housing comprising a document supporting surface for supporting an original document, whose image is to be read by the reading sensor, on an upper face thereof, wherein the first housing is swingably coupled to the second housing through a hinge to swing about an open/close axis extending in parallel with an edge of the document supporting surface, the first housing being swingable between a closed position, in which the first housing covers the document supporting surface, and an open position, in which the first housing exposes the document supporting surface;

wherein the widthwise direction is orthogonal to the open/close axis;

wherein the first outer face is located on a same side of the first housing as the open-close axis; and wherein the second outer face is located on a side of the first housing opposite to the open/close axis.

4. The sheet conveying apparatus according to claim 3, wherein a driving axis of the second driving source extends in a direction orthogonal to the widthwise direction.

5. The sheet conveying apparatus according to claim 4, wherein the driving axis of the second driving source inclines with respect to a vertical direction and a horizontal direction in a view along the widthwise direction.

6. The sheet conveying apparatus according to claim 1, wherein the first housing comprises a frame member arranged on the side of the first housing toward the first outer face, the frame member extending along the first outer face;

wherein the first driving source is located on a same side of the frame member as the conveyance guide and is supported by the frame member; and wherein the first driving train is located on a side of the frame member opposite to the conveyance guide and is supported by the frame member.

7. The sheet conveying apparatus according to claim 6, wherein the conveyance guide includes an approximately U-shaped portion, at which the conveyance guide extended sideward from the feed tray curves downward and turns to an opposite direction.

* * * * *